(12) United States Patent
Rowley

(10) Patent No.: US 9,286,375 B2
(45) Date of Patent: Mar. 15, 2016

(54) LINKED LIGHTWEIGHT DIRECTORY ACCESS PROTOCOL (LDAP) ATTRIBUTES

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1250 days.

(21) Appl. No.: 11/703,310

(22) Filed: Feb. 6, 2007

(65) Prior Publication Data

US 2008/0189304 A1 Aug. 7, 2008

(51) Int. Cl.
*G06F 17/30* (2006.01)
*H04L 29/12* (2006.01)

(52) U.S. Cl.
CPC ...... *G06F 17/30607* (2013.01); *H04L 61/1523* (2013.01); *H04L 29/12132* (2013.01); *H04L 61/1552* (2013.01)

(58) Field of Classification Search
CPC .................. G06F 17/30607; H04L 29/12132; H04L 61/1523; H04L 61/1552
USPC .............................. 707/100–200, 999.1–102
See application file for complete search history.

(56) References Cited

U.S. PATENT DOCUMENTS

| | | | |
|---|---|---|---|
| 5,799,141 A | 8/1998 | Galipeau et al. | |
| 6,192,362 B1 | 2/2001 | Schneck et al. | |
| 6,339,827 B1 * | 1/2002 | Stokes et al. | 713/176 |
| 6,347,312 B1 | 2/2002 | Byrne et al. | |
| 6,418,441 B1 | 7/2002 | Call | |
| 6,470,354 B1 | 10/2002 | Aldridge et al. | |
| 6,640,230 B1 | 10/2003 | Alexander et al. | |
| 6,651,070 B1 | 11/2003 | Hirashima et al. | |
| 6,714,930 B1 | 3/2004 | Garrison et al. | |
| 6,715,128 B1 | 3/2004 | Hirashima et al. | |
| 6,947,953 B2 | 9/2005 | Herzenberg et al. | |
| 6,970,873 B2 | 11/2005 | Fu et al. | |
| 7,043,472 B2 | 5/2006 | Aridor et al. | |
| 7,139,974 B1 * | 11/2006 | Bascom et al. | 715/236 |
| 7,209,970 B1 | 4/2007 | Everson et al. | |
| 7,444,594 B2 | 10/2008 | Abbot et al. | |
| 7,620,630 B2 | 11/2009 | Lloyd et al. | |
| 7,840,588 B2 | 11/2010 | Bell et al. | |
| 7,873,614 B2 | 1/2011 | Boreham et al. | |
| 7,941,419 B2 | 5/2011 | Bhatkar et al. | |
| 2002/0035569 A1 | 3/2002 | Clark et al. | |
| 2003/0037044 A1 | 2/2003 | Boreham et al. | |
| 2003/0055917 A1 | 3/2003 | Boreham et al. | |
| 2003/0061347 A1 | 3/2003 | Boreham et al. | |
| 2003/0078937 A1 | 4/2003 | Boreham et al. | |
| 2003/0078995 A1 | 4/2003 | Boreham et al. | |
| 2003/0084069 A1 | 5/2003 | Boreham et al. | |
| 2003/0088656 A1 | 5/2003 | Wahl et al. | |
| 2003/0088678 A1 | 5/2003 | Boreham et al. | |
| 2003/0105733 A1 | 6/2003 | Boreham et al. | |
| 2003/0105742 A1 | 6/2003 | Boreham et al. | |
| 2003/0115196 A1 * | 6/2003 | Boreham et al. | 707/4 |

(Continued)

OTHER PUBLICATIONS

Urbano, Randy, "Oracle Database Advanced Replication", 10g Release 1 (10.1), Oracle Corporation, (Dec. 2003), 342 pages.

(Continued)

*Primary Examiner* — Dinku Gebresenbet
(74) *Attorney, Agent, or Firm* — Lowenstein Sandler LLP

(57) ABSTRACT

Information to link two attributes in a database is stored, and when one of the attributes is updated, a new value for the second attribute is computed and stored. Related systems and applications are also described.

15 Claims, 5 Drawing Sheets

(56) References Cited

U.S. PATENT DOCUMENTS

| | | | |
|---|---|---|---|
| 2003/0135491 | A1 | 7/2003 | Rowley |
| 2003/0191751 | A1 | 10/2003 | Vora et al. |
| 2004/0006557 | A1 | 1/2004 | Baker et al. |
| 2004/0049518 | A1 | 3/2004 | Billieux et al. |
| 2004/0267670 | A1* | 12/2004 | Minyailov .................. 705/51 |
| 2005/0021498 | A1 | 1/2005 | Boreham et al. |
| 2005/0060646 | A1 | 3/2005 | Cauthier et al. |
| 2005/0080792 | A1* | 4/2005 | Ghatare .................. 707/100 |
| 2005/0160090 | A1* | 7/2005 | Harjanto .................. 707/3 |
| 2005/0171958 | A9 | 8/2005 | Cheng et al. |
| 2005/0203897 | A1 | 9/2005 | Kapitskaia et al. |
| 2005/0216485 | A1 | 9/2005 | Bell et al. |
| 2005/0228794 | A1 | 10/2005 | Navas et al. |
| 2006/0122963 | A1 | 6/2006 | Klein et al. |
| 2006/0179036 | A1 | 8/2006 | Broker |
| 2007/0016575 | A1 | 1/2007 | Hurst-Hiller et al. |
| 2007/0149190 | A1 | 6/2007 | Matsuhashi |
| 2007/0240050 | A1 | 10/2007 | Quinn-Jacobs |
| 2008/0114770 | A1 | 5/2008 | Chen et al. |

OTHER PUBLICATIONS

Red Hat Office Action for U.S. Appl. No. 11/607,559, mailed Nov. 12, 2008.
Red Hat Office Action for U.S. Appl. No. 11/607,559, mailed Apr. 30, 2009.
Red Hat Office Action for U.S. Appl. No. 11/607,559, mailed Oct. 5, 2009.
Red Hat Office Action for U.S. Appl. No. 11/656,579, mailed Dec. 9, 2008.
Red Hat Office Action for U.S. Appl. No. 11/656,579, mailed Apr. 27, 2009.
Red Hat Office Action for U.S. Appl. No. 11/656,579, mailed Sep. 24, 2009.
Red Hat Office Action for U.S. Appl. No. 11/706,011, mailed Jun. 12, 2009.
Red Hat Office Action for U.S. Appl. No. 11/706,011, mailed Sep. 1, 2009.
Red Hat Office Action for U.S. Appl. No. 11/607,559 mailed Mar. 16, 2010.
Red Hat Office Action for U.S. Appl. No. 11/656,579 mailed Apr. 28, 2010.
Red Hat Office Action for U.S. Appl. No. 11/706,011 mailed Jan. 22, 2010.
Red Hat Office Action for U.S. Appl. No. 11/706,011 mailed May 12, 2009.
Red Hat Office Action for U.S. Appl. No. 11/706,011 mailed May 26, 2010.
Office Action for U.S. Appl. No. 11/607,559, mailed Jun. 18, 2010.
Wahl, M., Netowrk Working Group, A summary of the X.500(96) User Schema for use with LDAPv3, Critical Angle Inc., Dec. 1997, 15 pages.
Zeilenga, K., Network Working Group, Lightweight Directory Access Protocol (LDAP): Technical Spericiation Road Map, OpenLDAP Foundation, Jun. 2006, 8 pages.
Red Hat Advisory Action for U.S. Appl. No. 11/706,011 mailed Nov. 3, 2009.
Red Hat Advisory Action for U.S. Appl. No. 11/706,011 mailed Jul. 27, 2010.
Red Hat Advisory Action for U.S. Appl. No. 11/706,011 mailed Aug. 15, 2011.
Red Hat Office Action for U.S. Appl. No. 11/607,559 mailed Nov. 19, 2010.
Red Hat Notice of Allowance for U.S. Appl. No. 11/607,559 mailed Jun. 17, 2011.
Red Hat Office Action for U.S. Appl. No. 11/656,579 mailed Aug. 1, 2011.
Red Hat Office Action for U.S. Appl. No. 11/706,011 mailed Dec. 22, 2010.
Red Hat Office Action for U.S. Appl. No. 11/706,011 mailed May 23, 2011.
Red Hat Notice of Allowance for U.S. Appl. No. 11/706,011 mailed Sep. 1, 2011.
Red Hat Advisory Action for U.S. Appl. No. 11/607,559 mailed Jul. 21, 2009.
Red Hat Advisory Action for U.S. Appl. No. 11/607,559 mailed May 17, 2010.
USPTO Office Action for U.S. Appl. No. 13/336,923 mailed Jan. 2, 2013.

* cited by examiner

LINKED LIGHTWEIGHT DIRECTORY ACCESS PROTOCOL (LDAP) ATTRIBUTES

FIELD

The invention relates to hierarchical database operations. In particular, the invention provides mechanisms to extend the capabilities of a Lightweight Directory Access Protocol ("LDAP") database.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity, contact and authorization information for people and organizations.

LDAP presents a hierarchical view of the data in a database. Records are presented as a tree of entries, each identified uniquely within the hierarchy by a Distinguished Name ("DN"). Entries contain one or more attributes, which consist of an attribute description (an attribute type with zero or more options), plus one or more values of the attribute. For example, an attribute type might be "givenName", and its value might be a text string that is the given name of a person whom the record describes.

Access to data in an LDAP database is provided by an LDAP server, which responds to commands from an LDAP client. For example, a client may create a new entry, delete an entry, rename an entry, modify an entry, or (most commonly) retrieve the attributes in an entry. Attribute types and the meaning and encodings of their values are often specified in RFCs and other standards that are designed to support a particular application. For example, RFC2307 describes a set of attribute types and object classes that can be used to map between traditional Unix user and group authentication data and attributes in an LDAP database.

Unfortunately, there is a fair amount of semantic overlap between the attributes required by various application-supporting standards. In other words, two standards may both define a "password" attribute, but may use a different attribute type for the value, or may require a different encoding method. Thus, for example, one client may expect an LDAP user record to contain a password encoded as a Unix "crypt" string, while another client may expect the LDAP user record to contain the password encoded in a different form. Maintaining all the different attributes and values expected by LDAP clients imposes a significant administrative burden, and administrative errors may cause some applications to fail in ways that are difficult to debug.

Automated approaches to LDAP database management may be of value in this environment.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention operate on the server side of a Lightweight Directory Access Protocol ("LDAP") server-client system and build compatibly on standard LDAP functionality to provide new features that can be accessed by legacy and naive clients. Attributes that have semantically-related values are linked so that a change to the value of one attribute is automatically reflected in the values of one or more linked attributes. Linked attributes can also be used to ensure that an attribute of an LDAP entry is supplied to a requesting client in a form that the client can process.

Figure 1:
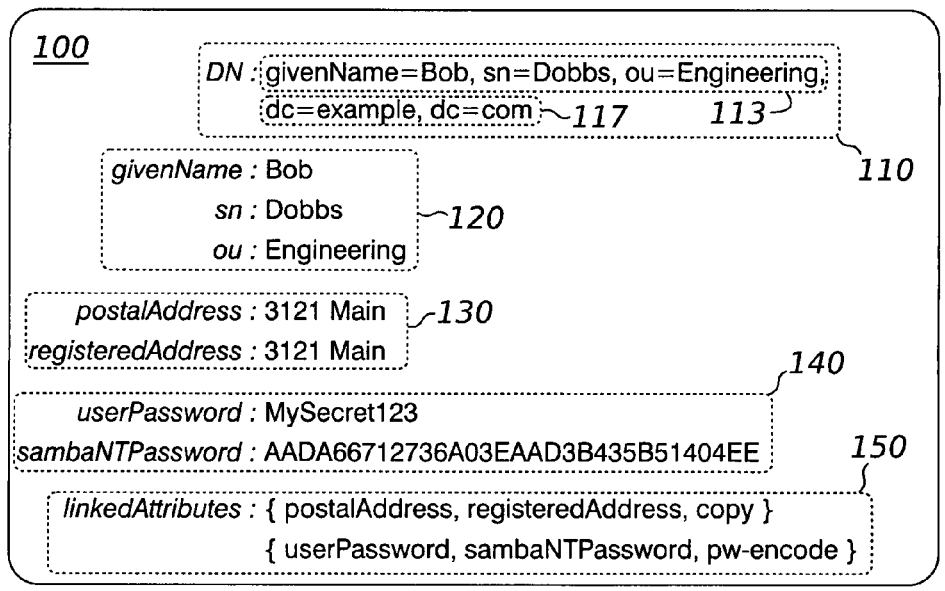
FIG. 1 shows a Lightweight Directory Access Protocol ("LDAP") entry with several linked attributes.

FIG. 1 shows an LDAP entry 100 containing attributes that describe a user of a computer system. The Distinguished Name ("DN") of the entry 110 contains a relative distinguished name ("RDN") 113 joined with the DN 117 of the entry's parent. The RDN is usually represented as one or more attribute-value assertions ("AVAs"), and includes some of the attributes 120 in the entry (these attributes are called "distinguished attributes.") An entry may contain other attributes ("ordinary" or "non-distinguished" attributes) 130, 140 and 150 as well.

LDAP entry 100 contains two pairs of entries whose semantic meanings are connected in ways relevant to embodiments of the invention. Attributes 130 are both defined in RFC2256, but the difference in meaning is frequently unimportant, so many applications may use one or the other without distinction. However, if the values of these two attributes become unsynchronized (unequal) when a new address value is stored in one attribute, some clients may end up using an old mailing address that is still stored in the other attribute. An embodiment of the invention can automatically ensure that a change to one attribute is reflected in the other attribute.

Similarly, attributes 140 both contain information to validate a password belonging to the subject of LDAP entry 100, Bob Dobbs. In a common scenario, the user might prefer to use the same password for all his authentication operations. However, some LDAP clients might validate a password against the plaintext value of the userPassword attribute, while others might validate against an encrypted or hashed value of the sambaNTPassword attribute. If the user changes his password, both of these attributes should be updated so that the different types of LDAP client will validate against the new password.

An embodiment of the invention could identify linked attributes that are to be updated together by storing an additional attribute (e.g., a multi-valued attribute 150) in LDAP record 100. The values of this attribute identify linked attributes that are to be updated or maintained together. The values shown in this example entry indicate that a change to the postalAddress attribute should be copied to the registeredAddress attribute (and vice versa), while a new value stored in the userPassword attribute should be encoded and used to update the sambaNTPassword attribute.

Another embodiment of the invention might store information about linked attributes in a separate database entry, or in several entries located in a predetermined portion of the database hierarchy, rather than identifying all of the linked attributes of an entry in the entry itself. This arrangement (not shown) may simplify administration tasks.

An embodiment of the invention may collect linked-attribute information from a variety of sources (e.g. from the subject entry itself, from entries above or below the subject entry in the hierarchy, or from a portion of the LDAP hierarchy set aside to contain linked attribute information) and proceed according to the method outlined in FIG. 2.

Figure 2:
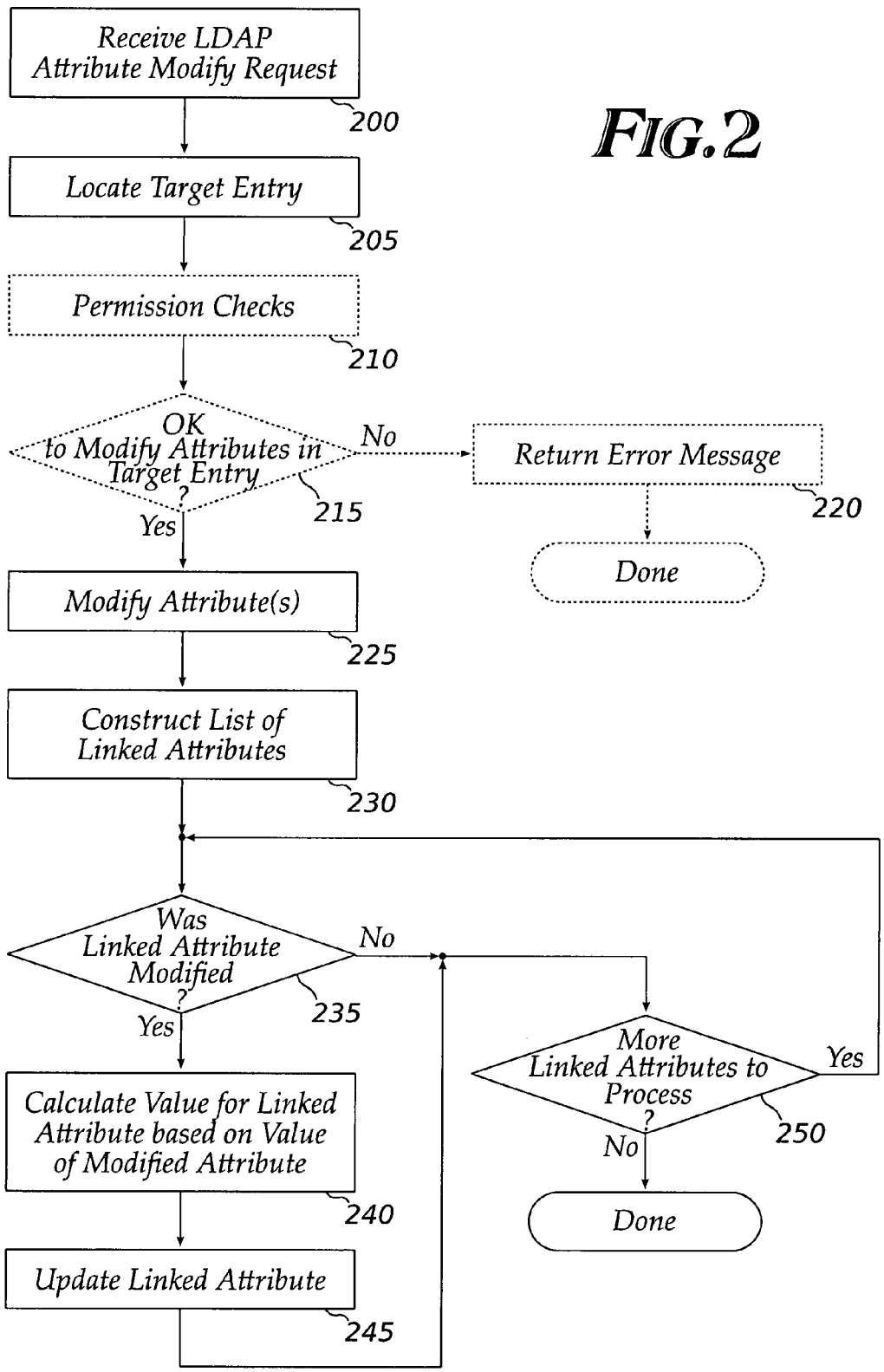
FIG. 2 outlines one embodiment of a method for updating linked attributes when an LDAP entry is modified.

FIG. 2 describes the operation of an embodiment of the invention from the perspective of an LDAP server which receives a client's request to modify an entry that includes one or more linked attributes.

Referring to FIG. 2, an LDAP server receives a message from an LDAP client, the message requesting a "modify" operation (200) to change the value of one or more attributes of a target record. The server locates the target record by, for example, looking up its DN (205). Permission and other similar checks may be performed to ensure that the LDAP client should be allowed to alter the target record (210). If the checks fail (215), an error message may be returned (220). Otherwise, the modifications requested by the message are made (225). A list of linked attributes is constructed (230), perhaps by collecting information from a variety of sources as described above. Then, for each linked attribute, if a value of one of the linked attributes was modified (235), a new value for the other attribute is calculated based on the modified value (240) and the linked attribute is updated correspondingly (245). If there are more linked attributes to process (250), a portion of this process is repeated. (The term "list" sometimes implies a specific type of data structure that can also be described as an "ordered set." However, embodiments of the invention are not restricted to ordered sets; in this disclosure, "list" is used in its colloquial sense to denote ordered sets, un-ordered sets, and other data structures that are suitable for manipulating a collection of records that describe linked attributes.)

Three or more attributes may be linked together, so that a change to any of the attributes will be propagated to the other linked attributes. Updating the linked attributes may involve simply copying the new value to the linked attribute, or calculating a new value for the linked attribute based on the new value of the changed attribute. Attributes may also be linked together in a chain, where a modification to a first attribute causes a unable to calculate a corresponding value for a linked attribute that was to contain a plaintext copy of the password, or that required a plaintext copy of the password to compute. In such a situation, an embodiment may reject the client's attempt to update the password so that the linked attributes do not become unsynchronized. A check for an attempt to modify a one-way updateable attribute can be incorporated with the permission checks mentioned at operations 210-220 in FIG. 2. To update linked password-type attributes, an embodiment may accept the plaintext password from the client and compute the encrypted or hashed values for storage.

Some embodiments of the invention process information identifying linked attributes and controlling linked-attribute operations in a priority order. For example, a low-priority record may establish a link between two attributes, and those attributes would ordinarily be kept synchronized by an embodiment of the invention. However, a higher-priority record may override the low-priority record for some database entries. As to the latter entries, the attributes might be unlinked (i.e. the higher-priority record might disable the attribute link set by the low-priority record), or a different update computation may apply to set the value of the linked attribute. Attribute linking information priority can be specified implicitly through the "distance" in the database hierarchy between the target entry and the entry containing the linked attribute information. For example, attribute linking information contained within the target entry itself may be of the highest priority, followed by attribute linking information collected from entries above the target entry in the database hierarchy, and lastly attribute linking information collected from a portion of the database hierarchy that contains general administrative and/or operational information.

Linked attributes can be used in another scenario as well. Instead of operating to keep two semantically-related attributes synchronized when one of the attributes' values is changed, a linked attribute can ensure that an entry retrieved from the database contains all the attributes the requesting client might need. For example, if a non-standard attribute is added to a network to support a site-specific function, and the attribute is later standardized (but with a different attribute type and/or encoding), the LDAP database may contain the necessary information to support clients that implement the standard, but the information is not stored or returned in a way the clients can use. Linked attributes can be used when preparing responses to LDAP queries to add correctly-typed and -formatted attributes.

Figure 3:
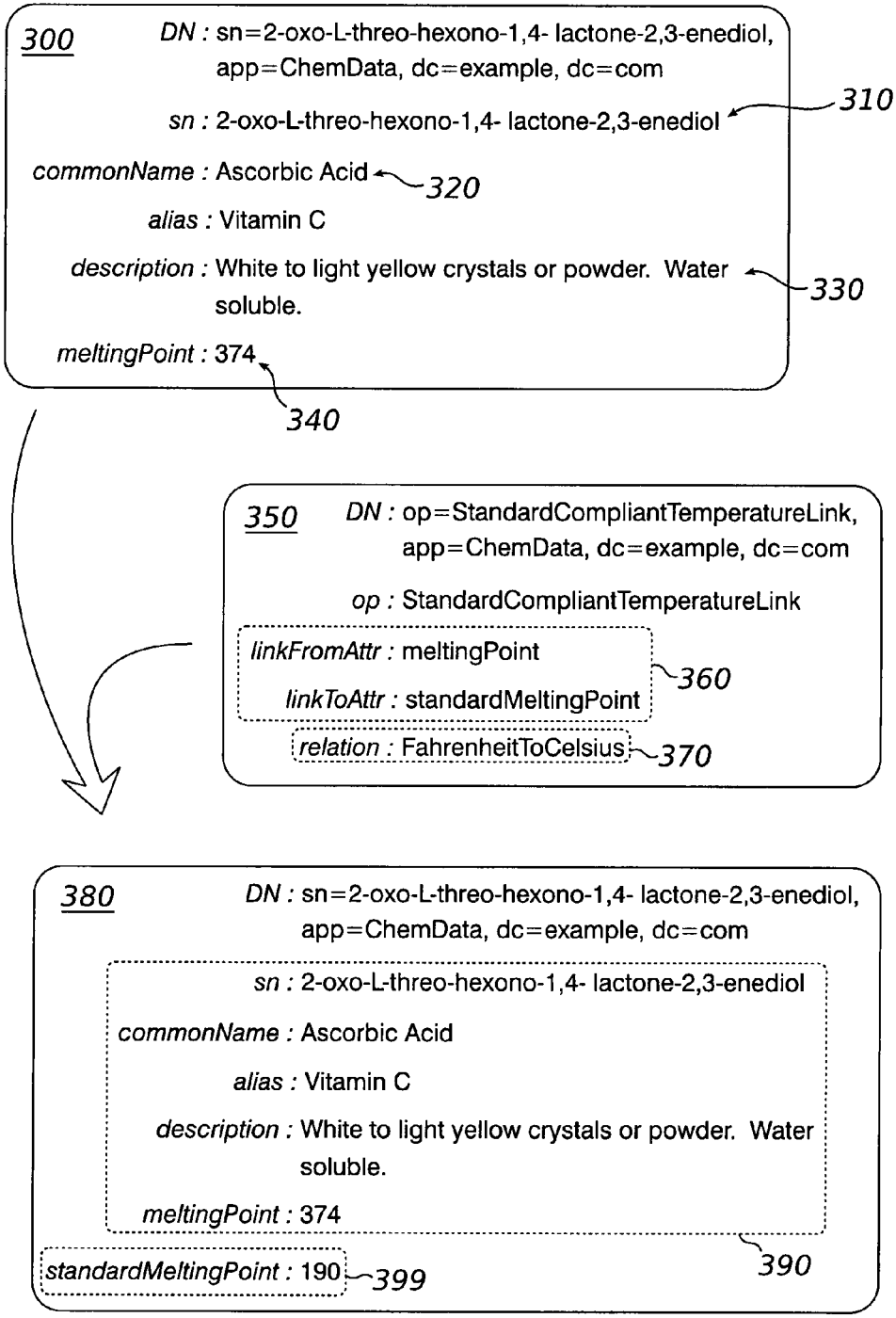
FIG. 3 shows another application of LDAP linked attributes.

FIG. 3 shows an example of this utilization. An LDAP database listing properties of various chemical compounds is prepared. Entries, such as the one shown as element 300, contain a scientific name 310, a common name 320, a description 330 and a melting point of a compound 340. When this database is prepared, the administrators choose to represent melting points in degrees Fahrenheit. Later, when the use of LDAP to report chemical data is standardized, melting points are required to be provided in degrees Celsius. The legacy LDAP database of which element 300 is an entry, using an embodiment of the invention, can be configured to respond in a standard-compliant way by adding another entry 350, which describes a link 360 between the Fahrenheit-specified melting point attribute 340 and a non-existent "standardMeltingPoint" attribute. Entry 350 specifies a conversion function FahrenheitToCelsius 370 to be used to calculate a value for the linked attribute. Subsequently, when an LDAP client submits a query for chemical data, the response 380 contains attributes 390 from the queried record, and an additional attribute 399 added to specify the melting point in degrees Celsius. Note that entry 350 may apply to link a "meltingpoint" attribute of any record with a "standardMeltingPoint" attribute. Therefore, all legacy chemical compound entries (containing only Fahrenheit melting point data) can be provided to standards-compliant clients. Any new entries that are created with a "standardMeltingPoint" attribute may be returned in response to a client's query without involving the linked-attribute system.

Figure 4:
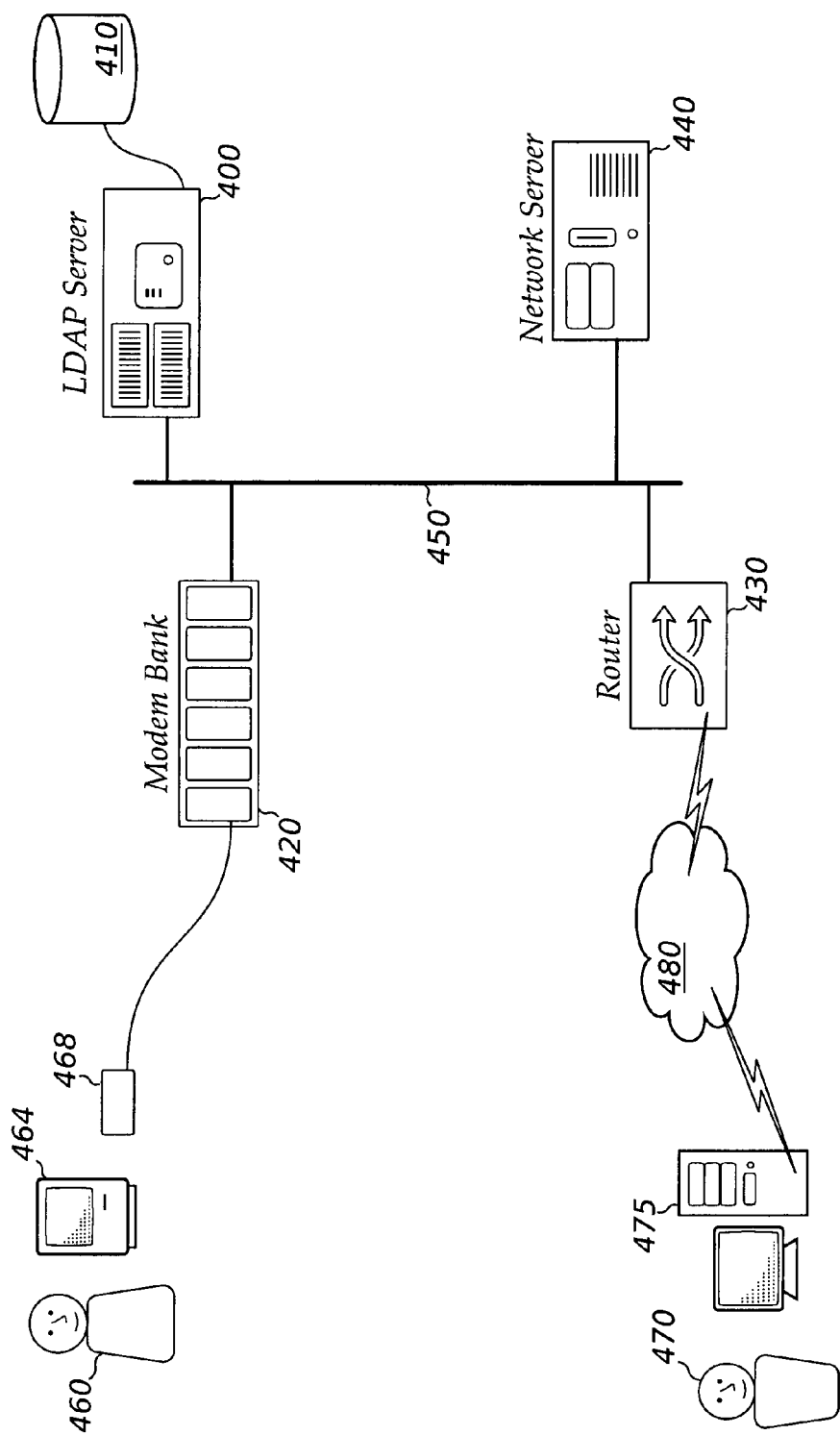
FIG. 4 shows an environment where an LDAP server supporting linked attributes may be used according to one embodiment of the invention.

Another example where this embodiment can be applied is shown in FIG. 4. An LDAP server 400 maintains information (e.g. in database 410) to direct the operation of a network-accessible service, where portions of the service are distributed over several different network devices 420, 430, 440 on a local area network ("LAN") 450. Each of the devices may comply with a different standard for obtaining operational information, so although the information any device needs may be largely similar to the information other devices need, each device may expect to receive some portion of the information as the value of a different attribute, or encoded differently, than other devices. As described above, LDAP server 400, implementing an embodiment of the invention, is configured with links associating semantically-related attributes describing, for example, the level of service to which a customer is entitled. Customer 460, accessing the network accessible service, may connect via a personal computer 464 and modem 468. Modem bank 420 and corresponding change to a second attribute, which in turn causes a corresponding change to a third attribute.

Linked attribute information used by an embodiment of the invention should permit the identification of at least one linked attribute, given the identity of an attribute that has been modified; and should also specify how the linked attribute is to be updated. Any two linked attributes may be part of the same database entry, or part of two different entries. If linked attributes are part of the same entry, then only attribute names may be needed for identification. If linked attributes are part of different entries, a Distinguished Name ("DN") or Relative Distinguished Name ("RDN") can be used to locate the linked attribute.

Linked attributes may operate asymmetrically: if the first of a pair of linked attributes is changed, then the second attribute is automatically updated with a value calculated by a first process; while if the second attribute is changed, then the first may be automatically updated with a value calculated by a second, different process. For a simple example of this asymmetry, consider two attributes "temperatureC" and "temperatureF." If the temperatureC attribute is modified, temperatureF will be updated with a value calculated as:

$$temperatureF = \frac{9}{5} \times temperatureC + 32 \qquad \text{Eq. 1}$$

If the temperatureF attribute is modified, temperatureC will be updated with a value calculated as:

$$temperatureC = \frac{5}{9} \times (temperatureF - 32) \qquad \text{Eq. 2}$$

Some linked attributes may operate in one direction only. Consider an authentication-related attribute like the password mentioned in reference to FIG. 1. Passwords are sometimes stored by using the actual password to encrypt a known string, then storing the encrypted string instead of the password itself, or by computing and storing a one-way hash value based on the password. This can provide improved security: even if the encrypted string or hash is compromised, an attacker cannot recover the password without performing a (possibly exhaustive) search or breaking the encryption or hashing algorithm. However, if an LDAP client attempts to update a password-like attribute by sending such an encrypted string, an embodiment of the invention would be network server 440 may both query LDAP server 400 to determine applicable information about customer 460's account status: is the customer to be permitted to connect to the network, pass traffic, and interact with the server? Another customer 470 may operate personal computer 475 to connect to the service via a distributed data network 480 such as the Internet. Router 430 and network server 440 may query LDAP server 400 for semantically-similar, but differently-encoded information about customer 470. For example, both modem bank 420 and router 430 may query LDAP server 400 for a user's password to validate an access attempt. If modem bank 420 and router 430 expect differently-encoded passwords, linked attributes can be used to support both clients without having to store users' passwords in several different formats. The use of linked attributes in LDAP server 400 can reduce the amount of data about each customer that must be maintained to respond to queries from various LDAP clients 420, 430 and 440. Linked attributes can also reduce the burden of managing customer data and help prevent service failures due to inconsistently-updated records.

Figure 5:
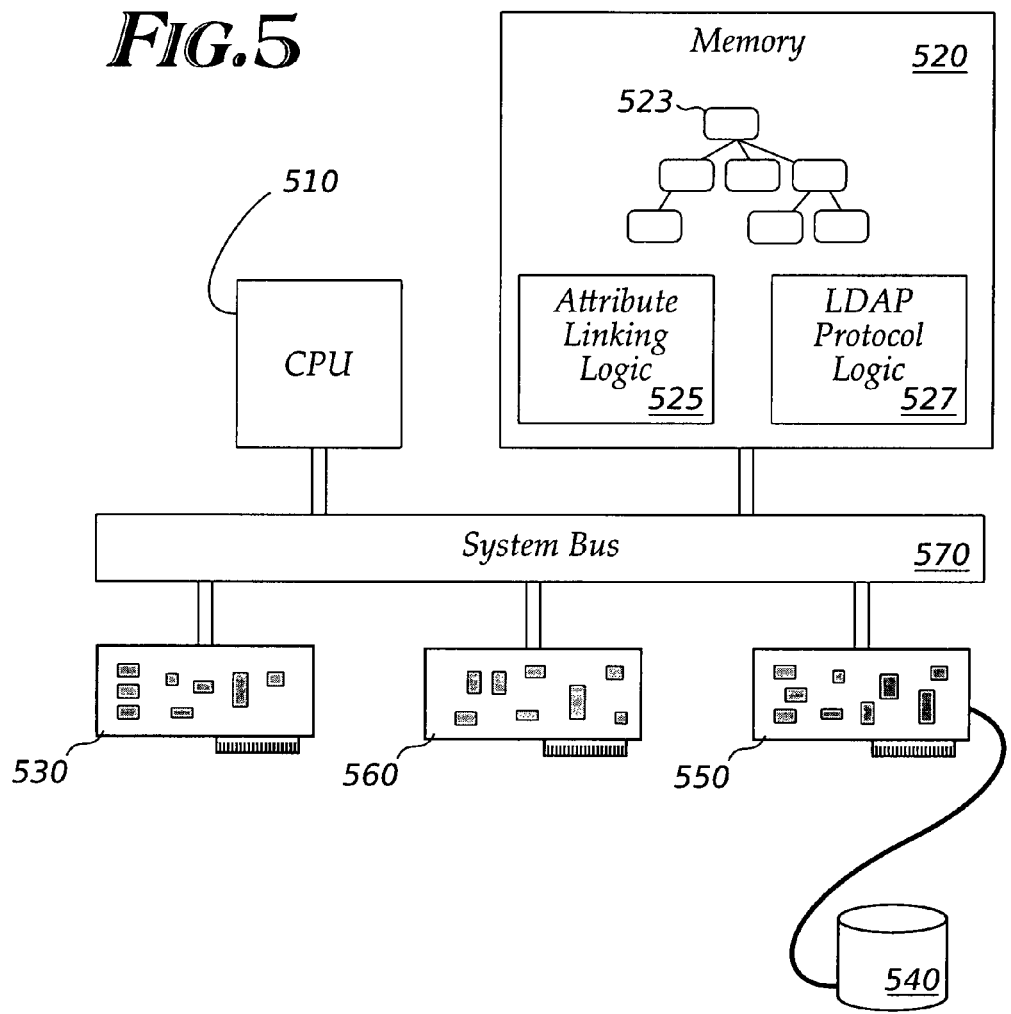
FIG. 5 shows some components and subsystems of a computing device that implements an embodiment of the invention.

FIG. 5 shows some components of a system that implements an embodiment of the invention. A programmable processor ("central processing unit" or "CPU") 510 operates under the control of executable instructions and data in memory 520 to perform methods according to embodiments of the invention. Memory 520 may contain data such as a portion of an LDAP directory hierarchy 523, executable instructions to perform attribute linking 525 (e.g. according to the method outlined in FIG. 2), and executable instructions to implement LDAP-protocol communications 527. A network interface 530 permits the system to communicate with clients over a distributed data network such as a local area network ("LAN") or the Internet (not shown in this Figure). Database records (e.g. LDAP entries) may be stored on mass storage device 540, which the system can read and write by using mass storage interface 550. The system's logical functions can be implemented by software in memory 520, by special-purpose hardware 560, or by a combination of software and hardware. Components and subsystems of the system shown here communicate and interact through signals carried by system bus 570.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that linked LDAP attributes can also be implemented by software and hardware that distribute the functions of embodiments of this invention differently than herein described. Such variations and implementations are understood to be captured according to the following claims.

What is claimed is:

1. A method comprising:
receiving a request to change a first attribute of an entry stored in a database to a first value, wherein the database is accessible via a Lightweight Directory Access Protocol;
identifying a second attribute and a third attribute of the entry stored in the database, the second attribute being a different attribute type than the first attribute and the third attribute comprising information linking the first attribute and the second attribute;
changing the first attribute to the first value;
identifying, by a processor in view of the third attribute, an operation to be performed with respect to the first value of the first attribute to determine a second value for the second attribute;
determining the second value for the second attribute by performing the identified operation; and
storing the second value to the second attribute;
wherein the first value of the first attribute is a password encoded by a first encryption and the second value of the second attribute is the password encoded by a second encryption.

2. The method of claim 1, wherein the second value for the second attribute is identical to the first value of the first attribute.

3. The method of claim 1, wherein the second value for the second attribute is determined by a predetermined formula operating on the first value of the first attribute.

4. The method of claim 1, wherein at least one of the first value of the first attribute or the second value of the second attribute is a common string encrypted by a password.

5. The method of claim 1, wherein at least one of the first value of the first attribute or the second value of the second attribute is an output of a one-way hash function of a password.

6. A non-transitory computer-readable medium comprising instructions that cause a processor to:
receive a request to modify a first attribute of an entry stored in a database to a first value, wherein the database is accessible via a Lightweight Directory Access Protocol;
identify a second attribute and a third attribute of the entry stored in the database, the second attribute being a different attribute type than the first attribute and the third attribute comprising information linking the first attribute and the second attribute;
change the first attribute to the first value;
identify, by the processor in view of the third attribute, an operation to be performed with respect to the first value of the first attribute to determine a second value for the second attribute;
determine the second value for the second attribute by performing the identified operation; and
store the second value to the second attribute;
wherein the first value of the first attribute is a password encoded by a first encryption and the second value of the second attribute is the password encoded by a second encryption.

7. The non-transitory computer-readable medium of claim 6, the processor further to:
receive the request from a client according to the Lightweight Directory Access Protocol; and
transmit the second value for the second attribute to the client according to the Lightweight Directory Access Protocol.

8. The non-transitory computer-readable medium of claim 6, the processor further to:
identify a plurality of attribute links linking the first attribute and the second attribute, wherein to identify comprises the processor to select a highest-priority of the attribute links.

9. A system comprising:
a memory;
a processor operatively coupled to the memory, the processor to:
receive a request to modify a first attribute of an entry stored in a database to a first value, wherein the database is accessible via a Lightweight Directory Access Protocol;
identify a second attribute and a third attribute of the entry stored in the database, the second attribute being of a different attribute type that the first attribute and the third attribute comprising information linking the first attribute and the second attribute;
change the first attribute to the first value;
identify, in view of the third attribute, an operation to be performed with respect to the first value of the first attribute to determine a second value for the second attribute;
determine the second value of the second attribute by performing the identified operation; and
store the second value to the second attribute;
wherein the first value of the first attribute is a password encoded by a first encryption and the second value of the second attribute is the password encoded by a second encryption.

10. The system of claim 9, wherein the first value of the first attribute permits user authentication via the first encryption and the second value of the second attribute permits user authentication via the second encryption.

11. The system of claim 9, the processor further to:
perform a search operation and return the value of the first attribute or the value of the second attribute, wherein the first value of the first attribute indicates an account status to a first Lightweight Directory Access Protocol client and the second value of the second attribute indicates the account status to a second Lightweight Directory Access Protocol client.

12. The system of claim 11, further comprising:
a local area network ("LAN"); and
at least one of a modem to receive data calls and place data traffic on the LAN, a router to direct data traffic onto and off of the LAN, or a network server to respond to requests carried over the LAN, wherein the modem, router or network server is to adjust operations in view of returned value.

13. The method of claim 1, wherein the first value of the first attribute is semantically related to the second value of the second attribute.

14. The method of claim 1, wherein identifying the operation is performed in view of a priority order.

15. The method of claim 1, wherein the third attribute comprises a first element identifying the first attribute, a second element identifying the second attribute, and a third element identifying the operation.

* * * * *